United States Patent [19]
Bodenas et al.

[11] Patent Number: 5,968,571
[45] Date of Patent: *Oct. 19, 1999

[54] PREPARATION OF PORTIONED MEAT PIECES HAVING SALAMI INCORPORATED THEREIN

[75] Inventors: Lars Goeran Bodenas, Munka Ljungby, Sweden; Jonas Peter Halden, Seuzach, Switzerland; Kjell Olsson, Angelholm, Sweden; Beat Denis Zurbriggen, Buelach, Switzerland

[73] Assignee: Nestec S.A., Vevey, Switzerland

[*] Notice: This patent is subject to a terminal disclaimer.

[21] Appl. No.: 08/964,963

[22] Filed: Nov. 5, 1997

[30] Foreign Application Priority Data

Nov. 6, 1996 [EP] European Pat. Off. ............. 96203098

[51] Int. Cl.⁶ .............................. A23L 1/314; A23L 1/318
[52] U.S. Cl. ........................... 426/281; 426/641; 426/646
[58] Field of Search ................................. 426/55, 56, 59, 426/281, 641, 646

[56] References Cited

U.S. PATENT DOCUMENTS

| | | |
|---|---|---|
| 1,129,868 | 3/1915 | Hoy . |
| 2,907,661 | 10/1959 | Niven et al. . |
| 3,821,445 | 6/1974 | Okamura et al. ........................ 426/370 |
| 4,229,458 | 10/1980 | Dreano et al. .......................... 426/264 |
| 4,254,151 | 3/1981 | Townsend ................................ 426/231 |
| 4,304,868 | 12/1981 | Gryczka et al. ........................ 435/253 |
| 4,362,750 | 12/1982 | Swartz ...................................... 426/59 |
| 4,402,987 | 9/1983 | von Lersner et al. .................. 426/281 |
| 4,539,210 | 9/1985 | O'Connell et al. ...................... 426/56 |
| 4,579,740 | 4/1986 | Matrozza .................................. 426/59 |
| 4,728,518 | 3/1988 | Gonzalez et al. ........................ 426/56 |
| 4,847,097 | 7/1989 | Boudreaux et al. ...................... 426/56 |
| 4,886,673 | 12/1989 | Hammes .................................... 426/56 |
| 4,960,599 | 10/1990 | Cozzini et al. ......................... 426/281 |
| 5,015,487 | 5/1991 | Collison et al. ........................ 426/332 |
| 5,374,433 | 12/1994 | Bowling et al. ............................ 426/8 |
| 5,576,035 | 11/1996 | Bowling et al. ............................ 426/8 |
| 5,827,550 | 10/1998 | Berglund et al. ......................... 426/59 |

FOREIGN PATENT DOCUMENTS

| | | |
|---|---|---|
| 0770336 | 5/1997 | European Pat. Off. . |
| 3500914 | 7/1986 | Germany . |
| 3502063 | 7/1986 | Germany . |
| 1530476 | 11/1978 | United Kingdom . |
| 8400283 | 2/1984 | WIPO . |

OTHER PUBLICATIONS

Banwart, *Basic Food Microbiology*, The AVI Publishing Company, Inc., Westport, Connecticut, 1981, pp. 285–287, 293 and 294.

Romans, et al., *The Meat We Eat*, The Interstate Printers and Publishers, Inc., Danville, Illinois, 1977, pp. 564–566.

Komarick, et al., *Food Products Formulary, vol. 1, Meats, Poultry, Fish, Shellfish*, The AVI Publishing Company, Inc., Westport, CT, 1974, pp. 26–33 & 38–55.

Gerrard, *Sausage and Small Goods Production*, Leonard Hill Books, London, England, 1969, pp. 94–96, 98–101.

Database Abstract, Derwent Information Ltd., WPI Accession No. 86–197874/198631, abstract of German Patent Application Publication No. DE–35 02 063 A1 (1986).

Database Abstract, Derwent Information Ltd., WPI Accession No. 86–190396/30, abstract of German Patent Application Publication No. DE–3500 914 A1 (1986).

*Primary Examiner*—Arthur L. Corbin
*Attorney, Agent, or Firm*—Vogt & O'Donnell, LLP

[57] ABSTRACT

A meat product is prepared by mixing frozen particles of salami in a brine, a pickle, or a marinade medium to obtain a suspension of the frozen particles in the medium and then the suspension is incorporated into a chilled portioned piece of meat to obtain a meat product containing the suspension.

20 Claims, No Drawings ized, preferably to from –2° to –8° C. and ground until the majority of the particles have an average size of less than 30 mm diameter and their average particle size is from 2 mm to 10 mm, preferably from 3 mm to 7 mm diameter.

PREPARATION OF PORTIONED MEAT PIECES HAVING SALAMI INCORPORATED THEREIN

BACKGROUND OF THE INVENTION

The present invention relates to incorporation of substances into meat.

Meat trimmings are obtained by removal from the meat during the standard preparation of whole cuts of meat in the meat industry. The trimmings are usually, but not always, of low quality and usually contain some fat and some muscle tissue. It is possible, by using technology introduced onto the market in recent years, to incorporate suspensions made of meat trimmings into whole cuts of like meat to increase the weight using a multi-needle injector. By controlling parameters such as the amount of trimmings injected, the meat/fat ratio and the quality of the meat, this technology enables the production of cooked ham or marinated meat products without affecting the standard quality with regard to flavour or shelf-life and without visibility of the suspension, and a way to improve binding and yield is described in U.S. Pat. No. 4,960,599. The cost saving of injecting trimmings is considerable when the trimmings are of low value compared to whole cuts of meat.

In order to impart a specificity to the flavour and to improve microbiological stability, it has been proposed to ferment raw meat by using a starter culture in a brine or marinade prior to cooking to produce bacteriocins. However, since the raw meat can under no circumstances be allowed to ferment at a temperature higher than about +8° C. prior to cooking, the biggest problem is to find a starter culture that can produce bacteriocins and a specific flavour at low temperature. We have tested some commercially available cultures, but the effect on the final quality of the product regarding flavour and microbiological stability is minimal.

In addition, the production time before the cooking step must be prolonged considerably.

SUMMARY OF THE INVENTION

As described in European Patent 0,770,336, it was found that by applying a fermentation step with a starter culture in the meat trimmings prior to incorporation into meat, it was possible to adapt the fermentation parameters such as temperature, time, humidity and ingredients, etc., to their optimal values. As described in that patent there is provided a process for preparing meat containing meat trimmings therein which comprises incorporating a frozen suspension of meat trimmings in a brine, marinade or pickle into chilled meat characterised in that before freezing, the meat trimmings are fermented with a starter culture.

We have now found, surprisingly, that by incorporating a frozen suspension of salami in a brine, marinade or pickle into chilled meat, a clear and pleasant salami taste may be obtained without affecting the standard quality of the meat with regard to shelf-life and without visibility of the suspension.

According to the present invention, there is provided a process for preparing meat containing salami therein characterised in that there is incorporated into chilled meat a frozen suspension of salami in a brine, marinade or pickle.

DETAILED DESCRIPTION OF THE INVENTION

In carrying out the present invention, the meat used in the process may be obtained from all types of meat such as pork, beef, lamb, poultry and fish. For example, raw whole cuts of meat may be chilled, e.g. to a temperature from –2° to 12° C., preferably from 2° to 10° C. and especially from 3° to 8° C., deboned and have the trimmings removed in the usual manner.

The salami may be incorporated into trimmed whole meat cuts as such or into smaller portions of meat formed by dividing the whole meat cuts into pieces having an average diameter of from 0.5 to 10 cm, more conveniently from 1 to 5 cm. When the salami is incorporated into whole cuts of meat, this may be carried out conventionally by injection, using for instance a multi-needle injector. When the salami is incorporated into smaller portions of meat, this may be carried out by mixing the salami with the smaller portions of meat, e.g. with agitation such as stirring or tumbling. For example, a suspension of the salami may be added directly to a tumbler.

Before incorporation into the meat, the salami is conveniently tempered to below 0° C., preferably to from –2° to –8° C. and ground until the majority of the particles have an average size of less than 30 mm diameter and their average particle size is from 2 mm to 10 mm, preferably from 3 mm to 7 mm diameter.

The salami is preferably mixed with a brine, pickle or marinate after freezing to a temperature of from –5° to –30° C., preferably from –15° to –25° C. to form a suspension. The brine, pickle or marinade may be at a temperature of 0° to –30° C. and preferably from –5° to –12° C. As is well known, a pickle is used for preserving meat and may contain brine, vinegar or other salt or acid liquor while a marinade is used for flavouring meat and may contain brine, vinegar or wine, oil, spices and herbs, etc. For instance, the salami may be mixed with sugar and a nitrite salt such as sodium nitrite. The pH of the mixture is usually in the range of from about 5.2 to 6.3, preferably from 5.5 to 6.0. The mixing may be performed by emulsifying one or more times, e.g. up to four times. The ratio of brine, pickle or marinade to the salami may be from 1:1 to 20:1, preferably from 1.5:1 to 15:1 and more preferably from 2:1 to 9:1. For example a brine may consist of a mixture of nitrite salt, sugar, ascorbate and water. The nitrite and ascorbate salts are conveniently the sodium salts.

The frozen suspension of salami in a brine, marinade or pickle is then warmed to a temperature preferably not greater than +1° C., for instance about –2° to –10° C., and preferably from –4° to –8° C. and incorporated into the chilled meat. Although it is possible to warm the suspension of salami to a temperature up to 5° C., if the suspension contains less than 25% salami, especially less than 10% meat, there is no clear advantage to do so and the temperature of the suspension preferably should not exceed +1° C., otherwise proteins would be extracted which would cause the suspension to thicken rapidly and this may cause subsequent clogging of needles when the salami is injected into the meat with needles.

The amount of salami incorporated into the meat may vary, e.g. up to 15%, conveniently from 1 to 10% and preferably from 2 to 6% by weight based on the weight of the meat. During the incorporation of the suspension of the salami into the meat, especially by injection, a portion of the suspension of the salami is squeezed out of the meat and may be returned to the batch containing the mixture of salami with brine where it is chilled down again. Any portion of the suspension returned is preferably emulsified at least once, more preferably at least two or three times, with the next batch because it may contain small meat particles which are disrupted from the muscles during injection and which could cause clogging of the needles. When the salami is incorporated by injection, a part of the suspension of the salami is preferably added separately so that some may be absorbed during tumbling since it is not usually possible to incorporate the exact desired percentage of suspension by injection.

If desired, in addition to the frozen suspension of salami, there may be incorporated into the chilled meat a frozen suspension of meat trimmings fermented with a starter culture prior to freezing as described in the afore-noted European Patent EP 0,770,336 95202882.7, preferably simultaneously with the salami. The amount of frozen meat trimmings may be up to 75%, preferably from 10 to 60% and more preferably from 20 to 50% by weight based on the weight of the salami.

After the injection, the meat may be processed conventionally.

The meat product may be a chilled product which is either non-cooked or cooked, or it may be frozen, preferably marinated, or dried. Examples of non-cooked chilled meat products are Lardon, bacon, cold smoked ham, etc. An example of a cooked and chilled meat product is cooked ham. For a cooked, chilled product such as cooked ham, the meat may undergo tenderisation, tumbling, moulding, cooking, chilling, storage, slicing and packaging by conventional methods such as are well known in the art. Advantageously, for a meat product which is cooked, such as cooked ham, the meat may be fermented prior to the cooking process. The process of the present invention may provide protection against undesirable bacteria such as Listeria in chilled products and improved flavour in frozen and dried products.

EXAMPLE

The following Example further illustrates the present invention. Parts and percentages are by weight.

Example 1

A whole ham was chilled to 5° C. and trimmed by removing fat, sinews, etc., before separating the ham into different whole meat cuts. Italian salami was tempered to −5° C. and ground in a Kilia grinder to an average particle size of 5 mm. The ground salami was frozen to −20° C. and mixed in a Hobart mixer with a brine at −8° C. composed of 10.08% sodium nitrite salt, 0.18% of sodium ascorbate, 2.28% of dextrose and 87.46% of water (corresponding to an injection level of 40.3% and a 7.2% level of salami in the final product) in a ratio of 3 parts brine to 1 part of salami. The mixing was carried out by emulsifying three times to form a suspension. The suspension was then injected at −6° C. into one of the whole cuts of ham through a multi-needle injector, and the ham containing the salami was then subjected to tenderisation, tumbling, moulding, cooking, chilling, storage, slicing and finally packaging by conventional methods.

The chilled cooked ham had a clear and pleasant salami taste. This is surprising because
i) a chilled cooked ham product into which had been injected 4% ham trimmings plus 2% salami oil flavour did not result in a salami flavoured ham, and
ii) a chilled cooked ham product into which had been injected 4% ham trimmings plus eight times the standard level of garlic liquid used in German "Saftschinken" did not impart the expected garlic flavour.

Example 2

A similar process to that described in Example 1 was followed except that the injection level of the suspension was only 23% instead of the 40.3% level used in Example 1, thereby giving an addition of only 4% salami in the final product instead of 7.2% in Example 1.

The chilled cooked ham had a clear and pleasant salami taste. This is surprising because:
i) a chilled cooked ham product into which had been injected 4% ham trimmings plus 2% salami oil flavour did not result in a salami flavoured ham, and
ii) a chilled cooked ham product into which had been injected 4% ham trimmings plus eight times the standard level of garlic liquid used in German "Saftschinken" did not impart the expected garlic flavour.

Example 3

By following a similar procedure to that described in Example 2 but using pepper salami from which the outer pepper layer had been removed before grinding, instead of Italian salami, similar results were obtained.

Example 4

By following a similar procedure to that described in Example 2 but using Swedish salami, instead of Italian salami, similar results were obtained.

We claim:

1. A process for preparing a meat product comprising freezing particles of salami to obtain frozen salami particles, mixing the frozen salami particles with a medium selected from the group consisting of a brine, a pickle and a marinade to obtain a suspension of the frozen particles in the medium and incorporating the suspension into a chilled portioned piece of meat to obtain a meat product containing the suspension, wherein the temperature of the suspension prior to incorporation into the meat piece does not exceed 1° C.

2. A process according to claim 1 wherein the chilled meat piece is at a temperature of from −2° C. to +12° C.

3. A process according to claim 2 wherein the suspension is at a temperature of from −2° C. to −10° C. for incorporation into the meat piece.

4. A process according to claim 1 wherein the suspension is at a temperature of from −2° C. to −10° C. for incorporation into the meat piece.

5. A process according to claim 1 wherein the frozen salami particles are at a temperature of from −5° C. to −30° C. for mixing with the medium and wherein the medium has a temperature of from 0° C. to −30° C.

6. A process according to claim 1 wherein the salami particles have an average particle size of less than 30 mm.

7. A process according to claim 1 wherein the suspension has a pH of from about 5.2 to 6.3.

8. A process according to claim 1 wherein the frozen salami particles and the medium are mixed in amounts and the suspension is incorporated into the meat piece in an amount so that the salami particles are incorporated into the meat piece and present in an amount of up to 15% by weight based on the weight of the meat.

9. A process according to claim 8 wherein the amount of salami particles incorporated into the meat piece and present therein is from 1% to 10% by weight based on the weight of the meat.

10. A process according to claim 9 wherein the salami particles and medium are mixed so that the particles and medium are in a weight ratio of medium to particles of from 2:1 to 9:1.

11. The product of the process of claim 9.

12. A process according to claim 1 wherein the salami particles and medium are mixed so that the particles and medium are in a weight ratio of medium to particles of from 1:1 to 20:1.

13. A process according to claim 1 further comprising mixing particles of fermented meat trimmings with the salami particles and medium to obtain the suspension so that the suspension further comprises the meat trimming particles.

14. A process according to claim 13 wherein the meat piece is a fermented meat piece.

15. The product of the process of claim 13.

16. A process according to claim 1 wherein the meat piece is a fermented meat piece.

17. A process according to claim 1 wherein the suspension is incorporated into the meat piece by a method selected from the group consisting of injecting the suspension into the meat piece and tumbling the meat piece with the suspension to incorporate the suspension into the meat piece.

18. A process according to claim 1 further comprising subjecting the meat product obtained to at least one further process step selected from the group consisting of chilling, freezing, drying and cooking.

19. A process according to claim 1 further comprising cooking the meat product obtained to obtain a cooked product and then chilling the cooked product.

20. The product of the process of claim 1.

\* \* \* \* \*